United States Patent [19]
Hayashi

[11] Patent Number: 5,611,174
[45] Date of Patent: Mar. 18, 1997

[54] DOME THEATER

[76] Inventor: Masahiko Hayashi, 12-22, Tsurumaki 3-chome, Setagaya-ku, Tokyo, Japan

[21] Appl. No.: 492,556

[22] Filed: Jun. 20, 1995

[30] Foreign Application Priority Data

Jun. 24, 1994 [JP] Japan .................................. 6-176222
Oct. 24, 1994 [JP] Japan .................................. 6-295486

[51] Int. Cl.⁶ .................................................. E04H 3/12
[52] U.S. Cl. ........................... 52/8; 52/6; 52/80.1; 353/94
[58] Field of Search ...................... 52/6, 8, 80.1; 353/94

[56] References Cited

U.S. PATENT DOCUMENTS

| | | | |
|---|---|---|---|
| 1,787,814 | 1/1931 | Chersanaz et al. | 52/8 |
| 3,210,895 | 10/1965 | Graf | 52/6 |
| 3,668,810 | 6/1972 | Bankston | 52/6 |
| 4,167,311 | 9/1979 | Pund | 353/94 X |
| 5,278,596 | 1/1994 | Machtig | 353/94 X |
| 5,500,747 | 3/1996 | Tanide et al. | 353/94 X |

*Primary Examiner*—Carl D. Friedman
*Assistant Examiner*—Beth A. Aubrey
*Attorney, Agent, or Firm*—Jordan and Hamburg

[57] ABSTRACT

According to the present invention, an image projected on a dome shaped screen or reproduced on an image producing apparatus of a dome shape can be viewed through windows of spectator compartments with highly realistic and panoramic effects.

11 Claims, 21 Drawing Sheets

DOME THEATER

BACKGROUND OF THE INVENTION

The present invention relates to a dome theater in which an image projected on a dome shaped screen or produced by a display apparatus(s) arranged in a domed configuration is shown.

Conventional domed image producing systems offer a wide-angle image and have mainly been applied to all-sky optical projectors such as planetariums. Recently, they are used as large scale motion picture projectors and may be constructed exclusively or along with planetarium systems, forming dome theaters.

Such a dome theater has been developed based on a planetarium system, thus having some disadvantages in term of visibility.

When the dome theater is tilted at an optimum angle of 35°, an audience or spectators exert efforts to turn and keep their faces upward.

For easing the efforts, reclining chairs may be employed. However, the reclining chairs are relatively large in size thus decreasing the number of the spectators for a given floor space.

If the dome shaped screen is tilted to a higher angle, the seating floor has to be tipped proportionally. It is known that the floor slope for installation of seats should be at a maximum of 35° to conform to applicable laws. The tilt of the dome shaped screen is required not to exceed the maximum angle.

The higher the tilting angle of the seating floor, the easier the spectators can watch the dome shaped screen. However, the highly tilted floor allows the spectators to reach their seats only with much difficulty and is thus be disadvantageous in safety, and particularly, unfavorable in the case of emergency evacuation. Some spectators may actually feel fear when standing and looking down on the floor slope of 35°. Most of the conventional dome theaters hence have a floor slope of not more than 30°.

There is a multi-floor seating structure composed of arrays of spectator compartments. Generally, most of such multi-floor structures are prepared as complementary facilities with minor equipment and often have three or less floors.

As understood, a majority of the conventional dome theaters are tipped at a very small angle near horizontal and are rarely accompanied with such a multi-floor seating structure.

Traditional theaters or cinemas, including dome shaped screen facilities, are designed to allow a large number of spectators to stay together in a limited space thus substantially prohibiting chattering, drinking, eating, or leaving during the display or projection of images.

Also, as the distance from the dome shaped screen is varied, depending on the location of a seat in a viewing area, the spectators in the front seats may find it difficult to view the full screen.

In general, the dome shaped screen is large and used to display a motion picture.

The motion picture films are however inadequate for editing or modifying as they are not interactive.

For eliminating the foregoing drawback, the use of large sized video projectors has been developed. Even if the quality and brightness of images produced by such projectors are accepted, the installation of the large sized projectors creates another problem. In fact, no obstruction is allowed between the dome shaped screen and the projector. It would be understood that traditional theaters are strictly classified into an image producing facility such as a cinema and an auditorium such as an opera house or a music hall. The conventional dome theaters which provide high quality images pay less attention to plays and musics.

Although advanced visual effecting systems, including laser devices, have been employed for producing top-notch lighting effects in the opera houses and music halls, they are hardly comparable to today's state-of-art image producing systems. In other words, facilities which simultaneously provide a quality screen image, a stage play, and a rich sound have unsuccessfully been introduced and new art styles exploiting the three different manners are not known.

As apparent, the traditional theaters allow their stages to be divided by old fashioned curtains and decorated with classic scenery settings for simulating dramatic backS grounds.

Such traditional scenery settings and curtains are limited in producing visual effects. Only some of the audience, mainly those seated in the front end, can enjoy those effects.

Also, fabrication of the scenery settings and curtains involves consumption of much labor and time. In addition, the scenery settings and curtains have to be replaced with different ones after an act of play is ended or transported from one theater to another, increasing the cost of labor.

SUMMARY OF THE INVENTION

It is an object of the present invention to provide an improved dome theater which produces highly realistic, panoramic effects of an image by eliminating the foregoing disadvantages of conventional dome theaters and overcoming the substantial problems of common theaters.

It is another object of the present invention to provide a dome theater having a plurality of spectator compartments arranged horizontally and vertically in an array so that one or more spectators in each compartment can view an image projected on a dome shaped screen or reproduced on a display apparatus(s) arranged in a dome configuration without concern for spectators seated up front. The prescribed and other objects and features of the present invention will be understood by reading carefully the following description in conjunction with the accompanying drawings.

The drawings are illustrative and are not to be limitatire of the scope of the present invention.

DESCRIPTION OF THE PREFERRED EMBODIMENTS

Figure 1:
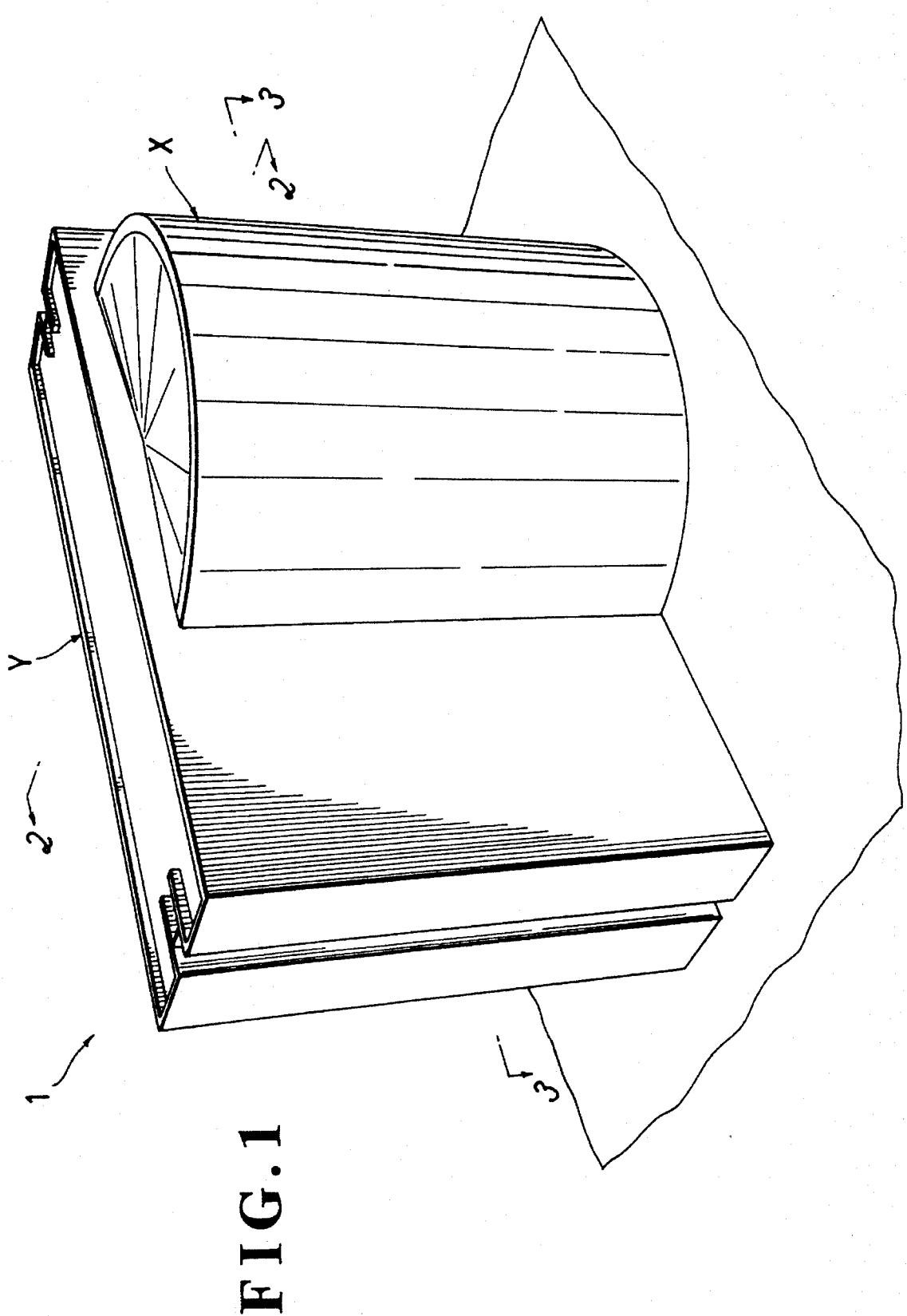
FIG. 1 is a perspective view showing a first embodiment of the present invention.
Figure 2:
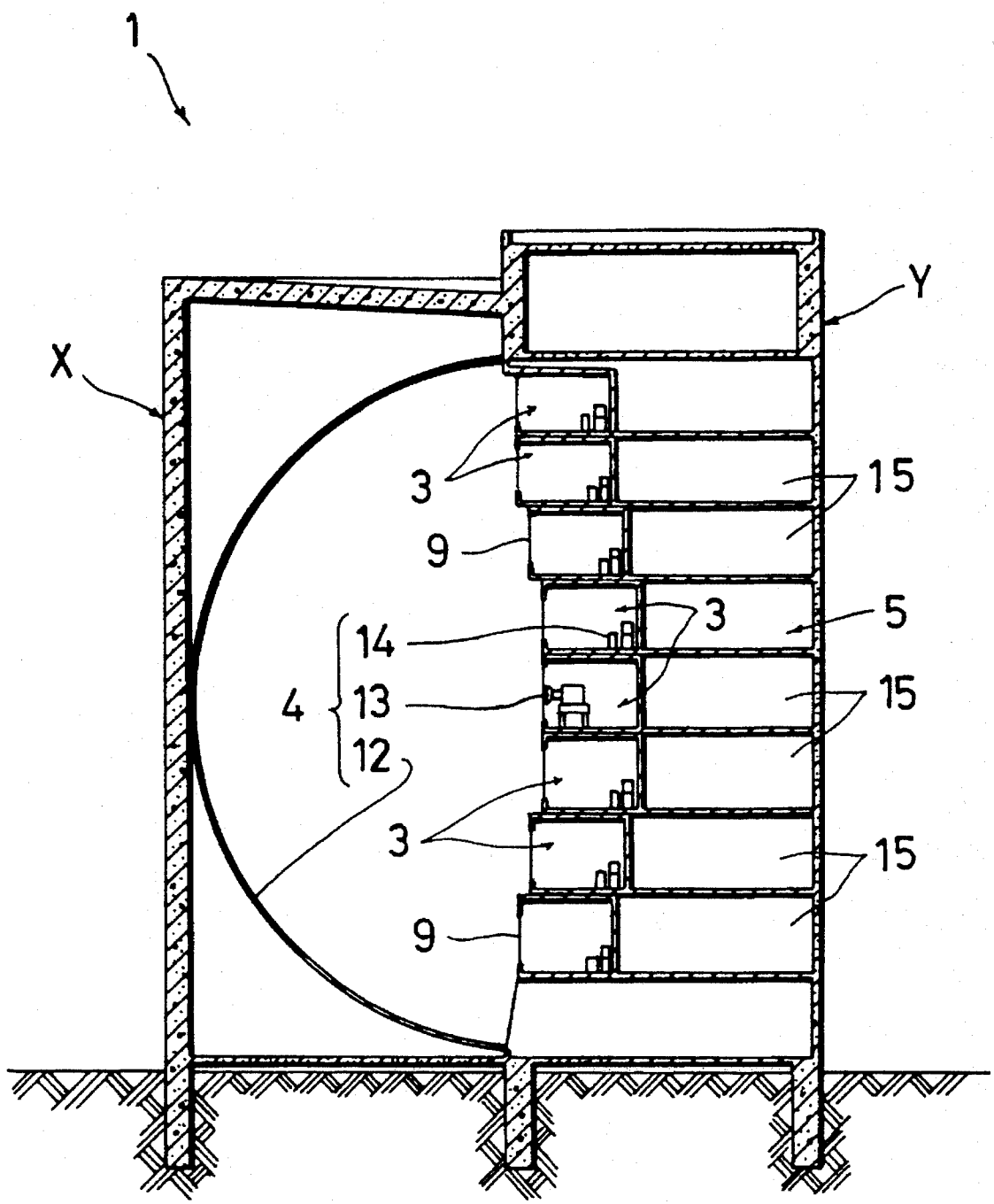
FIG. 2 is a cross sectional view taken along the line 2—2 of FIG. 1.
Figure 3:
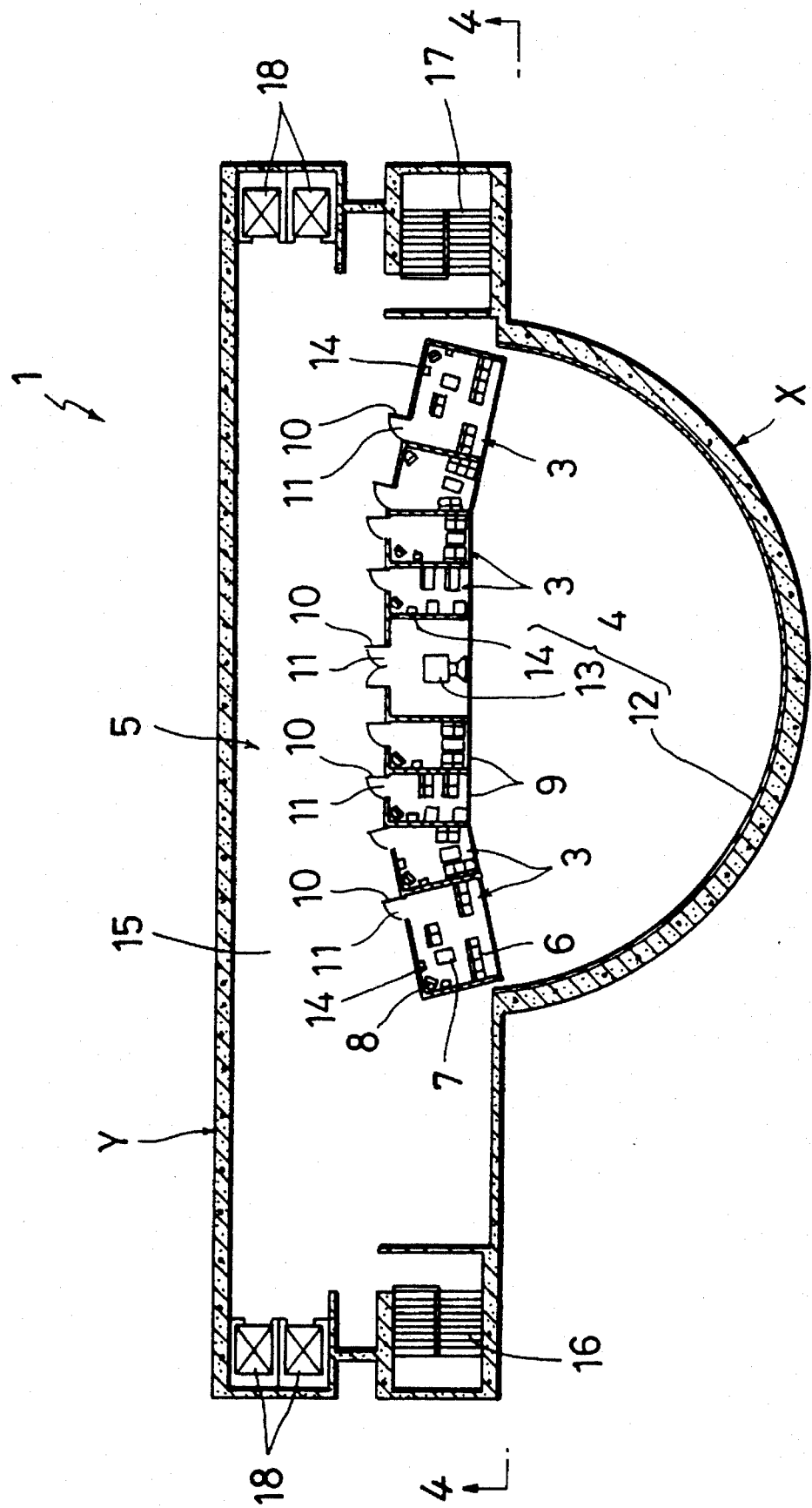
FIG. 3 is a cross sectional view taken along the line 3—3 of FIG. 1.
Figure 4:
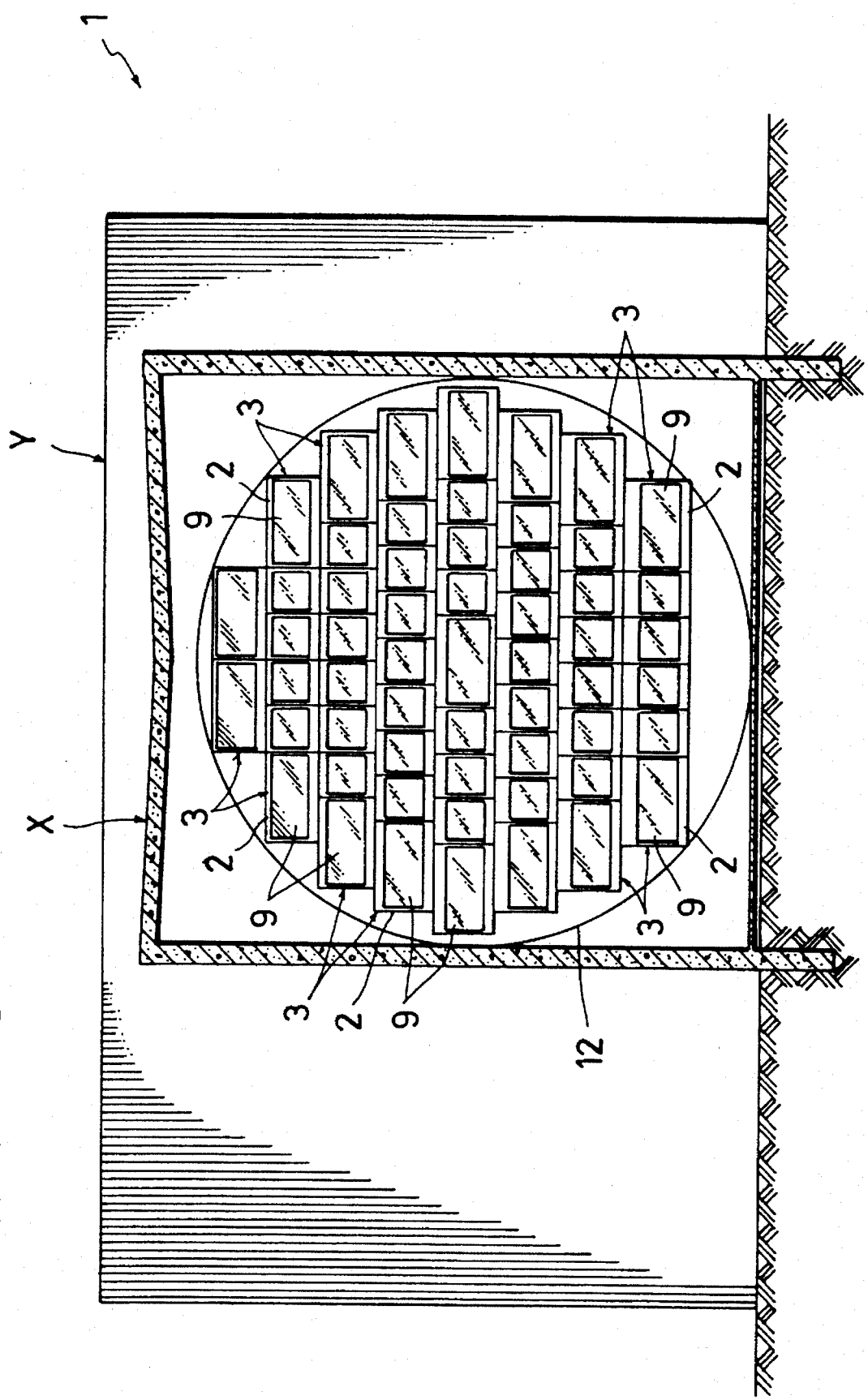
FIG. 4 is a cross sectional view taken along the line 4—4 of FIG. 3.
Figure 5:
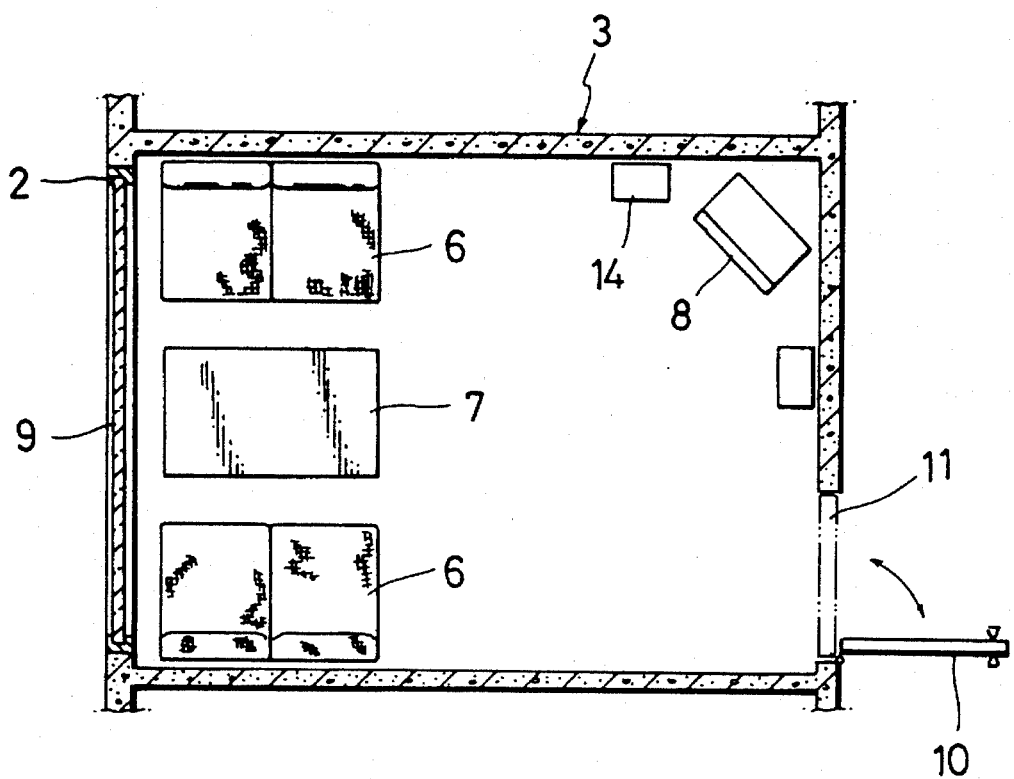
FIG. 5 is a cross sectional view of a compartment.
Figure 6:
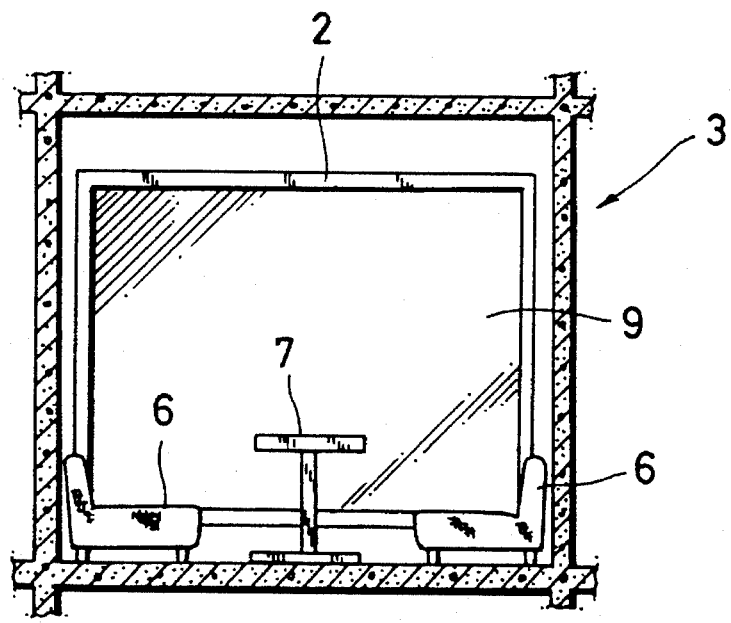
FIG. 6 is a longitudinal cross sectional view of the compartment.

Preferred embodiments of the present invention will be described in more details referring to the accompanying drawings.

FIGS. 1 to 6 illustrate a first embodiment of the present invention, in which a dome theater 1 comprises a dome housing X and a compartment building Y. The compartment building Y of the dome theater 1 has a plurality of compartments 3 arranged horizontally and vertically in an array, each having a window 2 provided in the front thereof. The dome housing X contains a domed image producing system 4 disposed therein front of the windows 2 of the compartments 3. Also, passages 5 are provided in the compartments building Y for access to the compartments 3.

The compartments 3 may be different in the size, ranging from pair use to full-floor use. The compartments 3 are arrayed so that radially outer ones are set forward from inner ones as starting from the center of the array. Each the compartment 3 may be furnished with chairs 6, a table 7, and a karaoke set 8, as shown.

The front window 2 of the compartment 3 is furnished with or without a transparent plate 9 made of e.g. acrylic or glass material. Also, an entrance 11 with a door 10 is arranged in the back of the compartment 3.

The domed image producing system 4 comprises a dome shaped, hemispherical screen 12 disposed to cover the front of the compartments 3, a projector 13 mounted in the center of the compartment array for projecting an image on the inside wall of the dome shaped screen 12, and loud speakers 14 allocated to the compartments 3 for producing a sound synchronized with the image.

The passages 5 include corridors 15 on each floor, stairways 16, 17 arranged at both ends of the corridors 15 leading one floor to another, and elevators 18, 18 for ease of movement of the spectators.

During operation of the dome theater 1, the image projected by the projector 13 on the dome shaped screen 12 viewed through the windows 2 of the respective compartments 3. As the image on the dome shaped screen 12 is well spaced from the windows 2 of the compartments 3, it produces a panoramic and realistic effect.

Other embodiments of the present invention will now be described referring to FIGS. 7 to 27. Throughout the drawings of the embodiments, like components are denoted by like numerals as of the first embodiment and will be explained in no more details.

Figure 7:
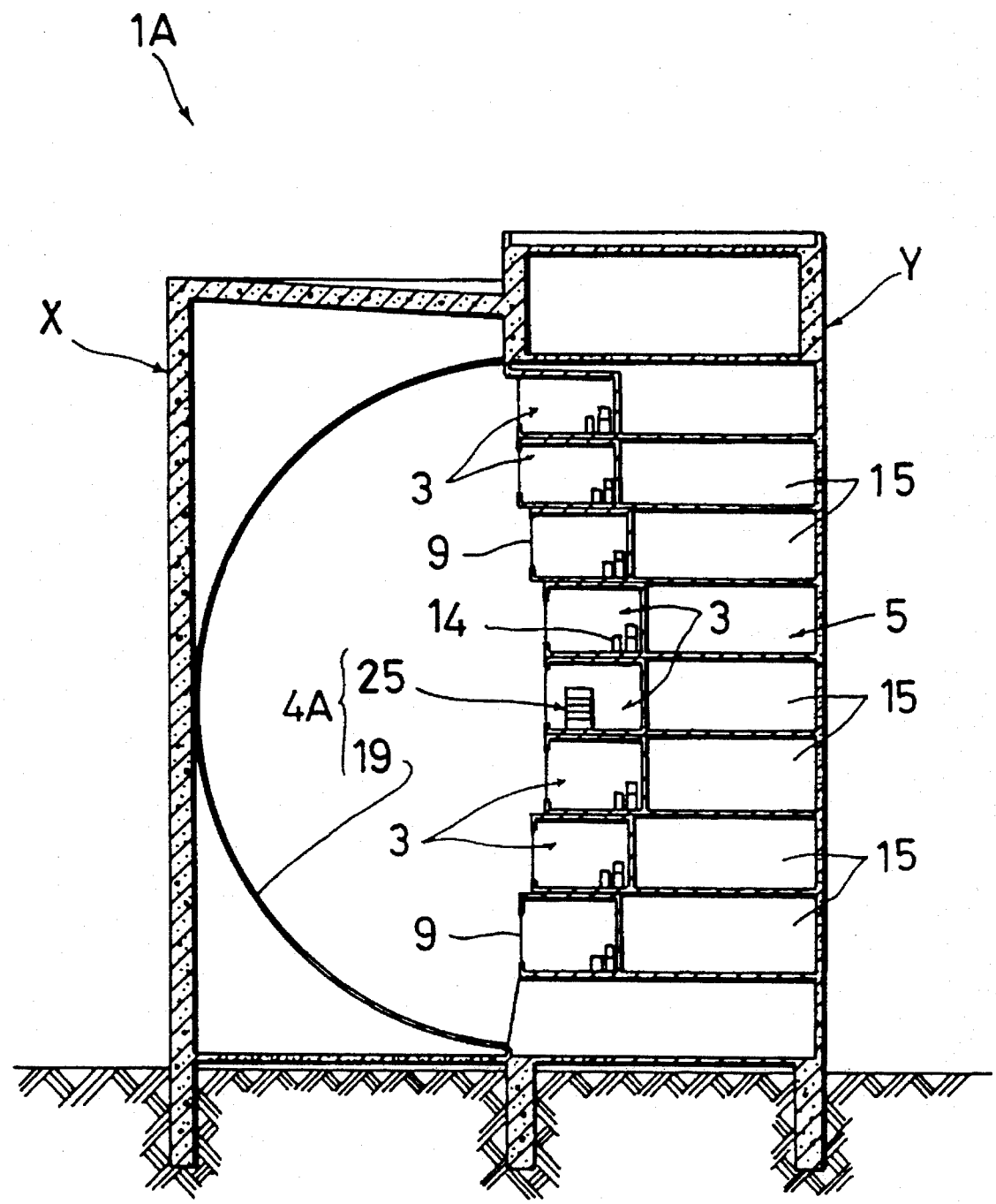
FIGS. 7 to 9 are explanatory views showing a second embodiment of the present invention.
Figure 8:
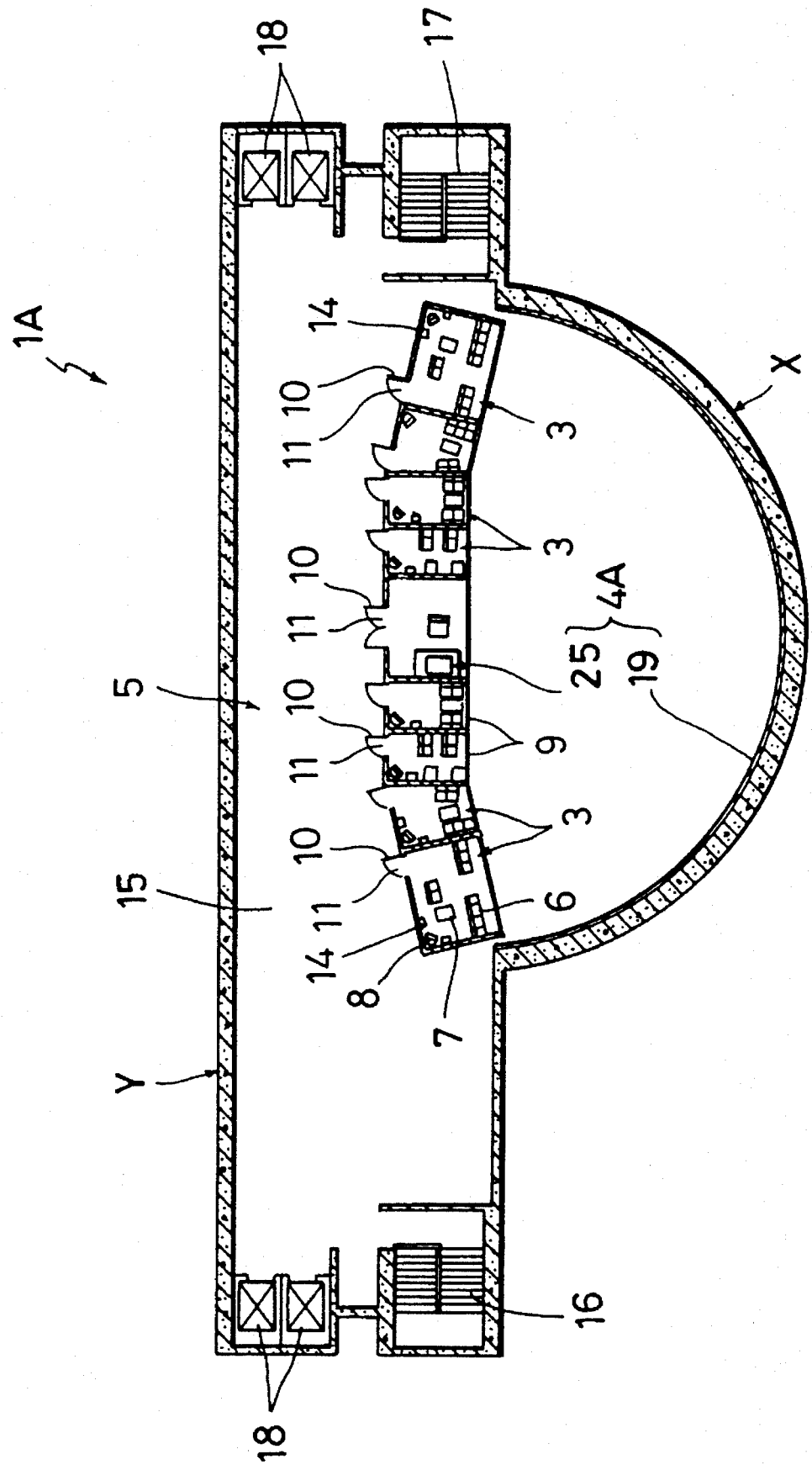
Figure 9:
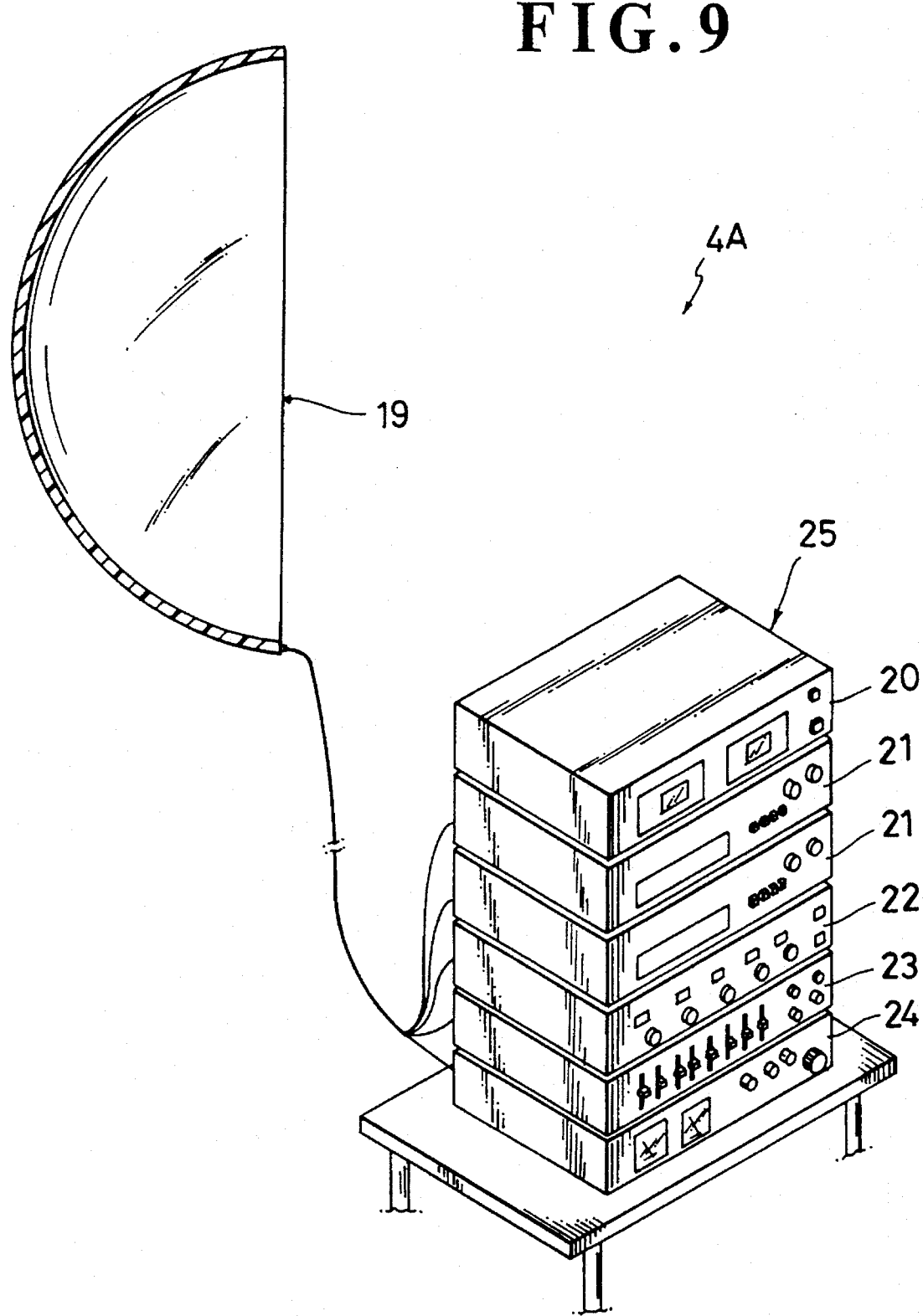

FIGS. 7 to 9 illustrate a second embodiment of the present invention which is distinguished from the first embodiment by the fact that the domed image producing system 4 is replaced with another like system 4A. The domed image producing system 4A comprises a hemispherical, dome shaped liquid crystal display 19 and an AV unit 25 including a double cassette player 20 for reproducing an image to be displayed on the liquid crystal display 19, video players 21, 21, a video selector 22, a mixer 23, and an amplifier 24.

A dome theater 1A with the domed image producing system 4A according to the second embodiment will provides the same 0 effects as of the first embodiment.

Figure 10:
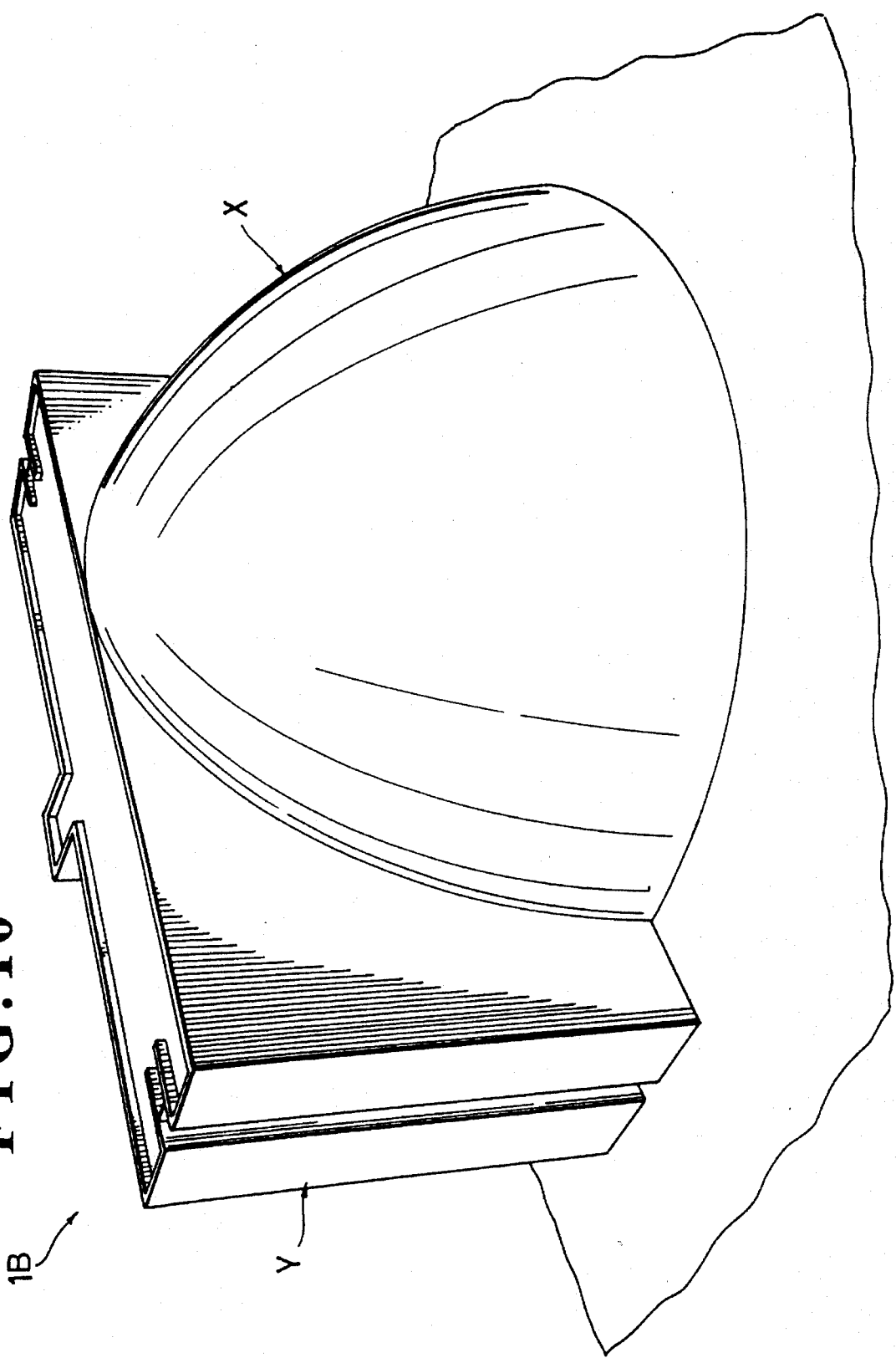
FIGS. 10 to 12 are explanatory views showing a third embodiment of the present invention.
Figure 11:
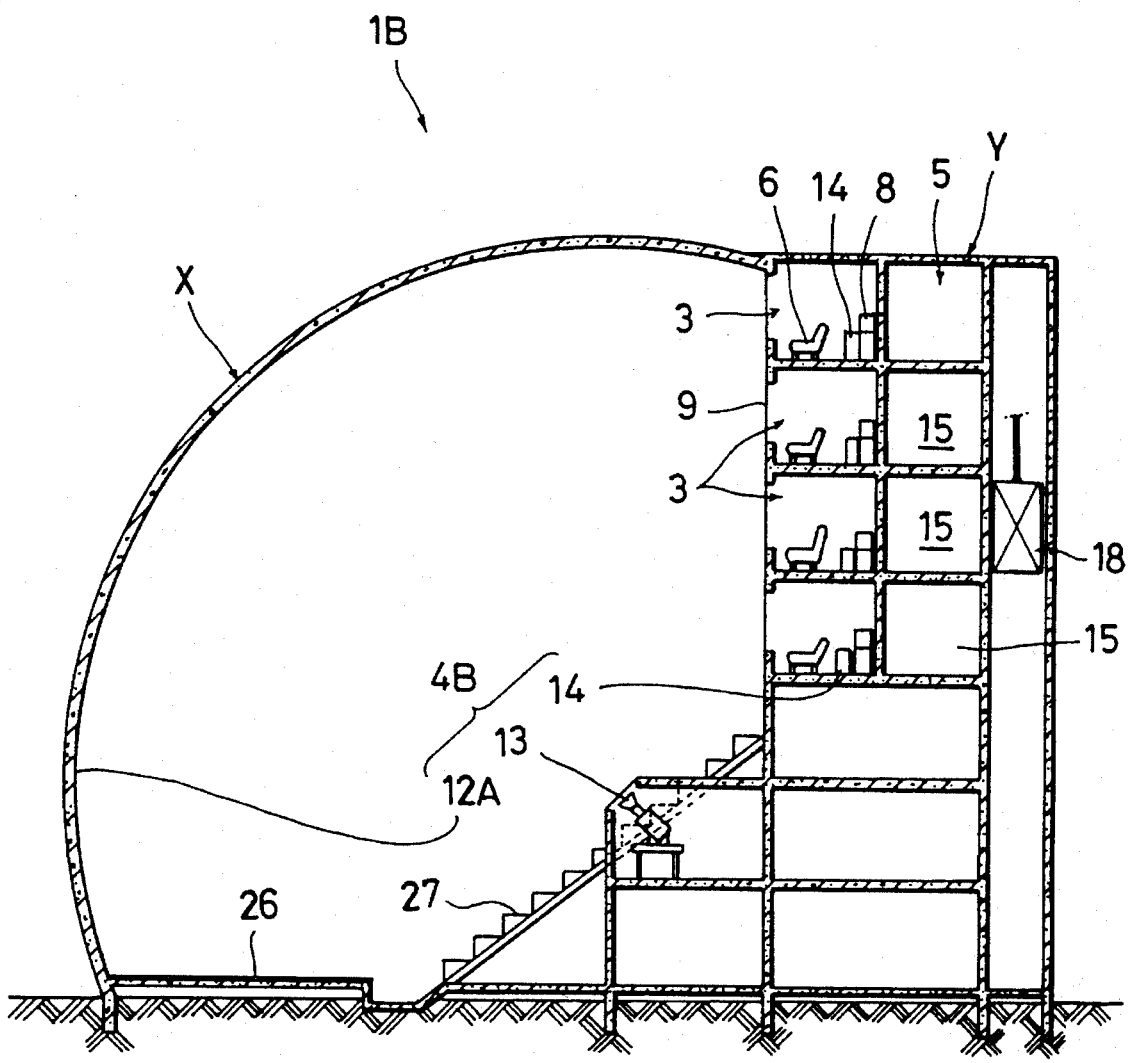
Figure 12:
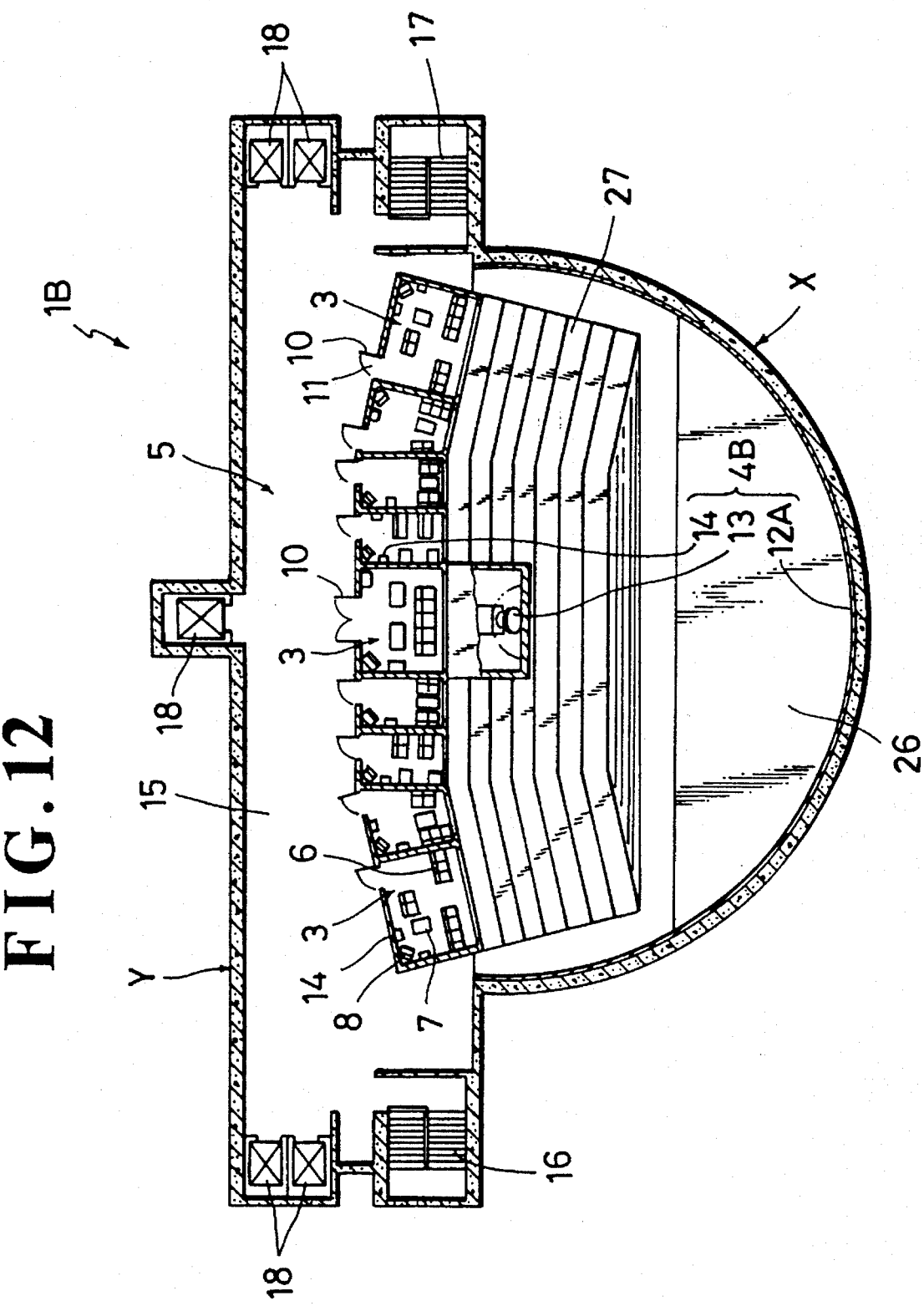

FIGS. 10 to 12 show a third embodiment of the present invention which is distinguished from the first embodiment by the fact that the domed image producing system 4 is replaced with another like system 4B which includes a quarter-spherical dome shaped screen 12A. In addition, a stage 26 and a staircase-type seating area 27 are provided in a combination under a dome shaped, quarter-spherical screen 12A. A dome theater 1B with the image producing system 4B according to the third embodiment will provide the same effects as of the first embodiment while being increased in the versatility.

Figure 13:
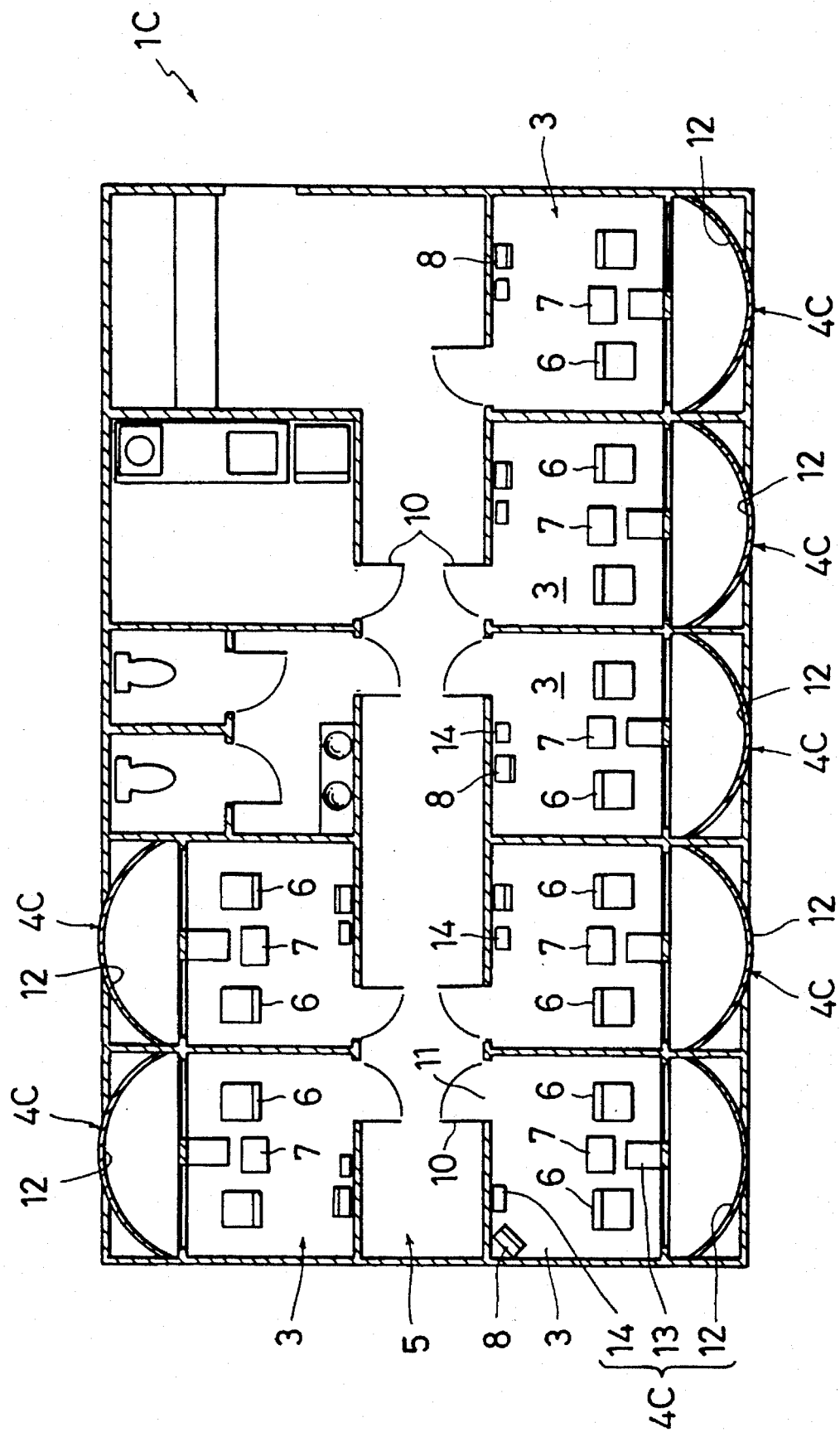
FIGS. 13 to 15 are explanatory views showing a fourth embodiment of the present invention.
Figure 14:
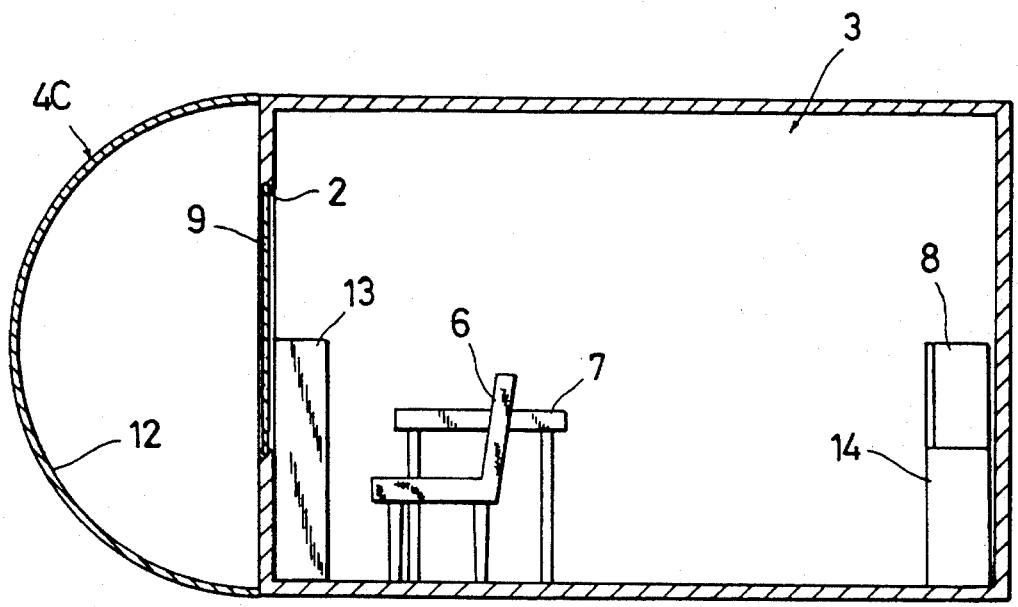
Figure 15:
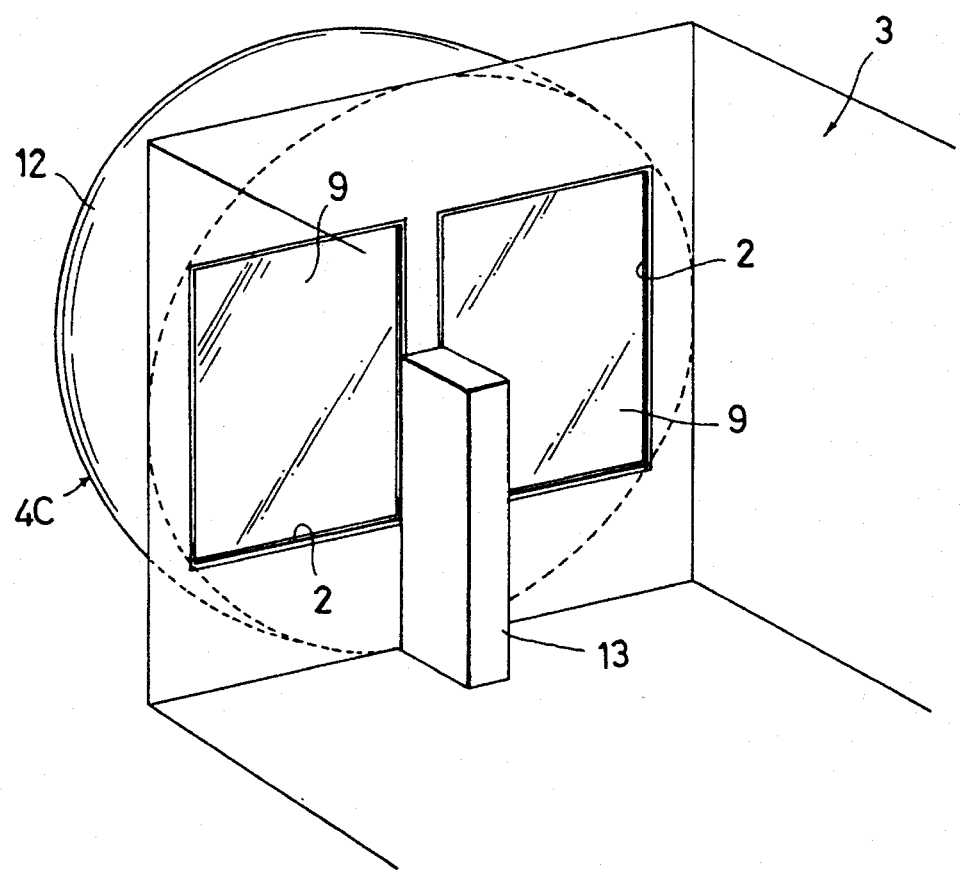

FIGS. 13 to 15 illustrate a fourth embodiment of the present invention which is distinguished from the first embodiment by the fact that the domed image producing system 4 is replaced with rows of like systems 4C. While the compartments 3 are aligned in two rows on both sides of the passage 5, their windows 2 face the domed image producing systems 4C respectively. A dome theater 1C with the multiple domed image producing systems 4C according to the fourth embodiment will provide the same effects as the first embodiment while different images can concurrently be distributed to their respective compartments 3.

According to this embodiment, each of the compartments 3 may be exploited as a dome theater model.

Figure 16:
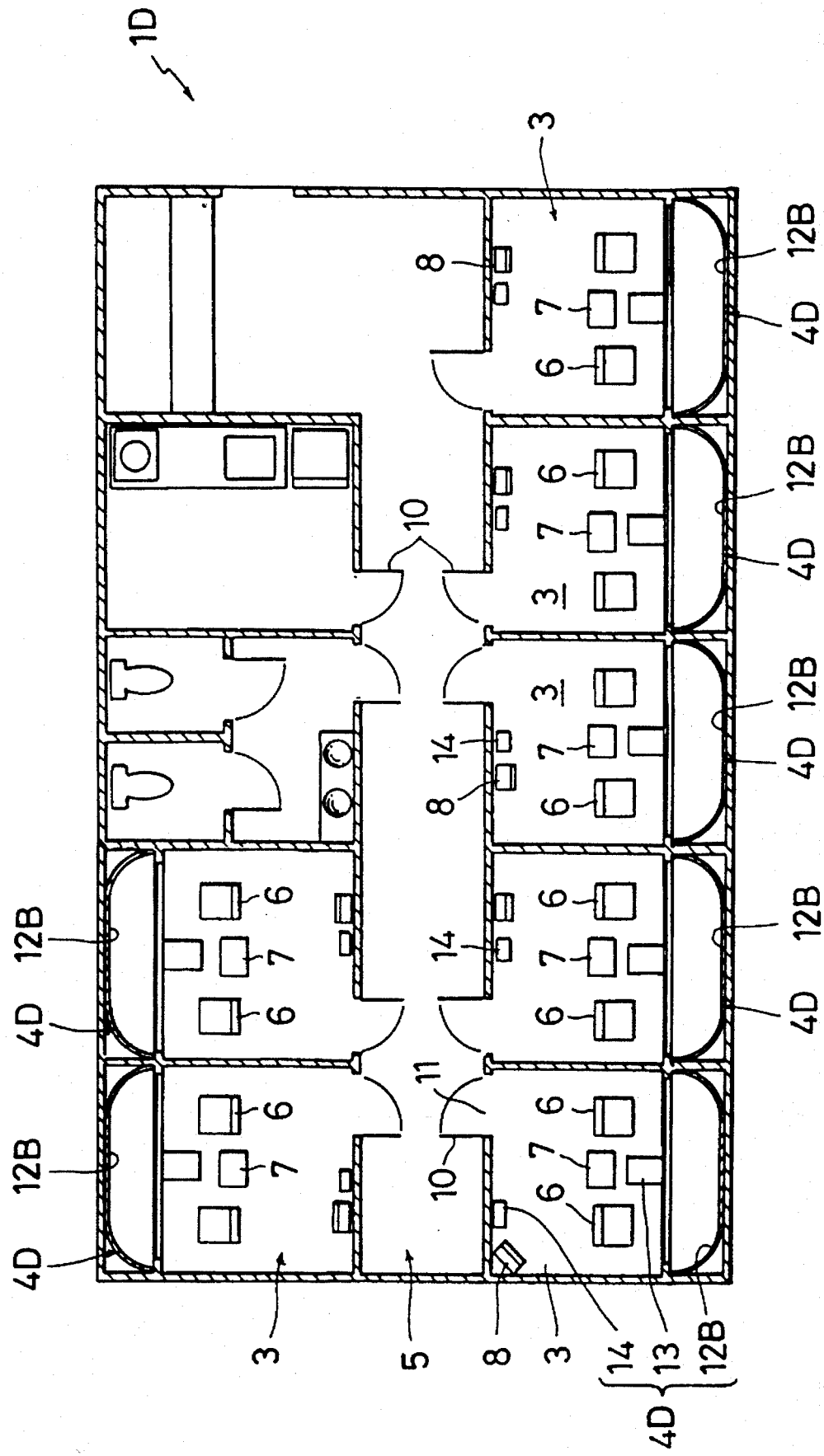
FIGS. 16 to 18 are explanatory views showing a fifth embodiment of the present invention.
Figure 17:
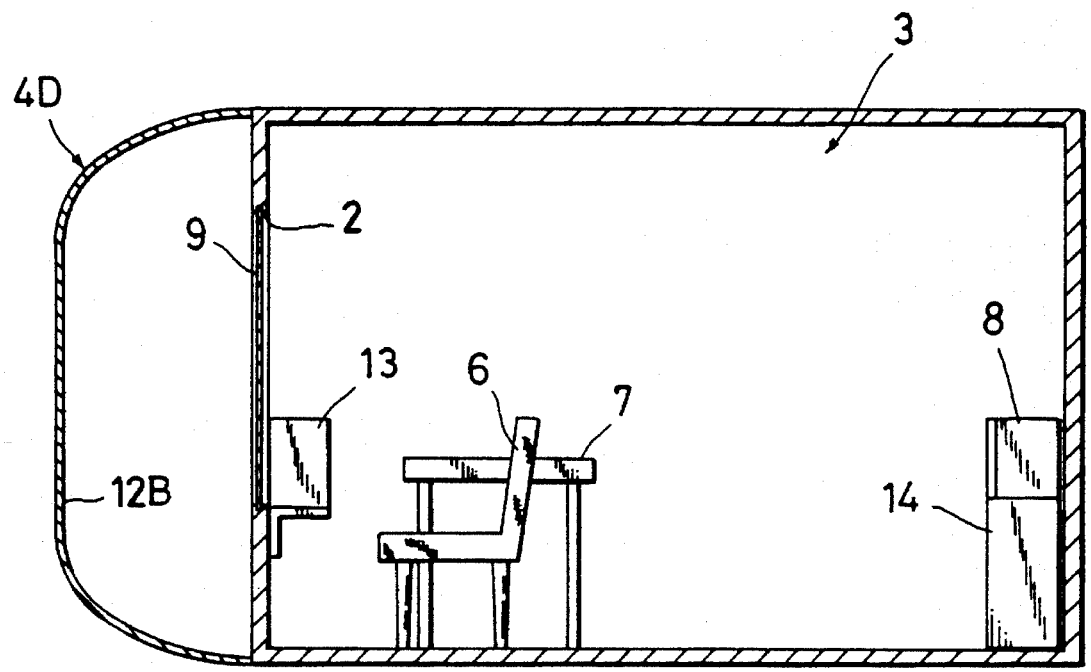
Figure 18:
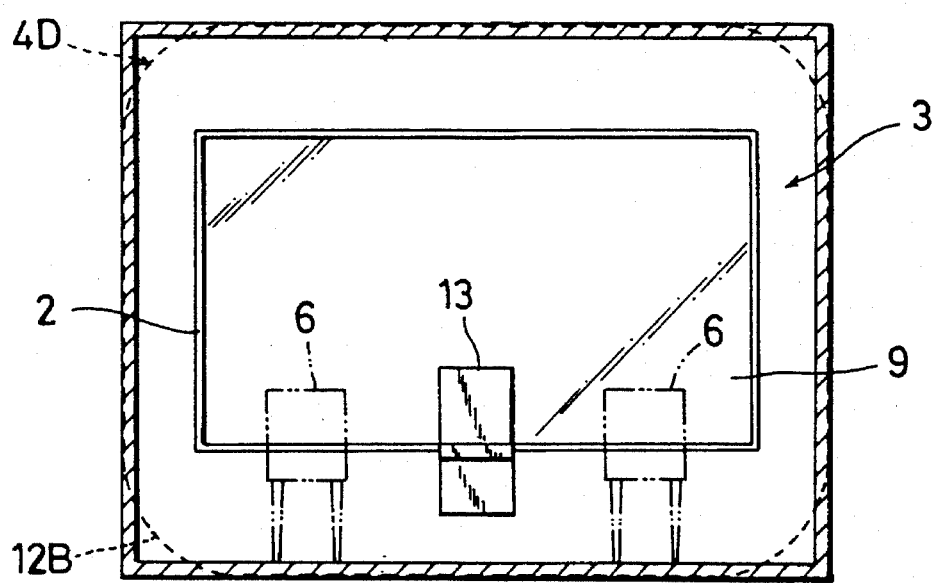

FIGS. 16 to 18 show a fifth embodiment of the present invention which is distinguished from the fourth embodiment by the fact that the domed image producing system 4C is replaced with another like system 4D which includes a dome shaped screen 12B. The dome shaped screen 12B has a flat portion arranged in the center peak thereof. A dome theater 1D with the dome shaped screens 12B according to the fifth embodiment will provide the same effects as the fourth embodiment.

Figure 19:
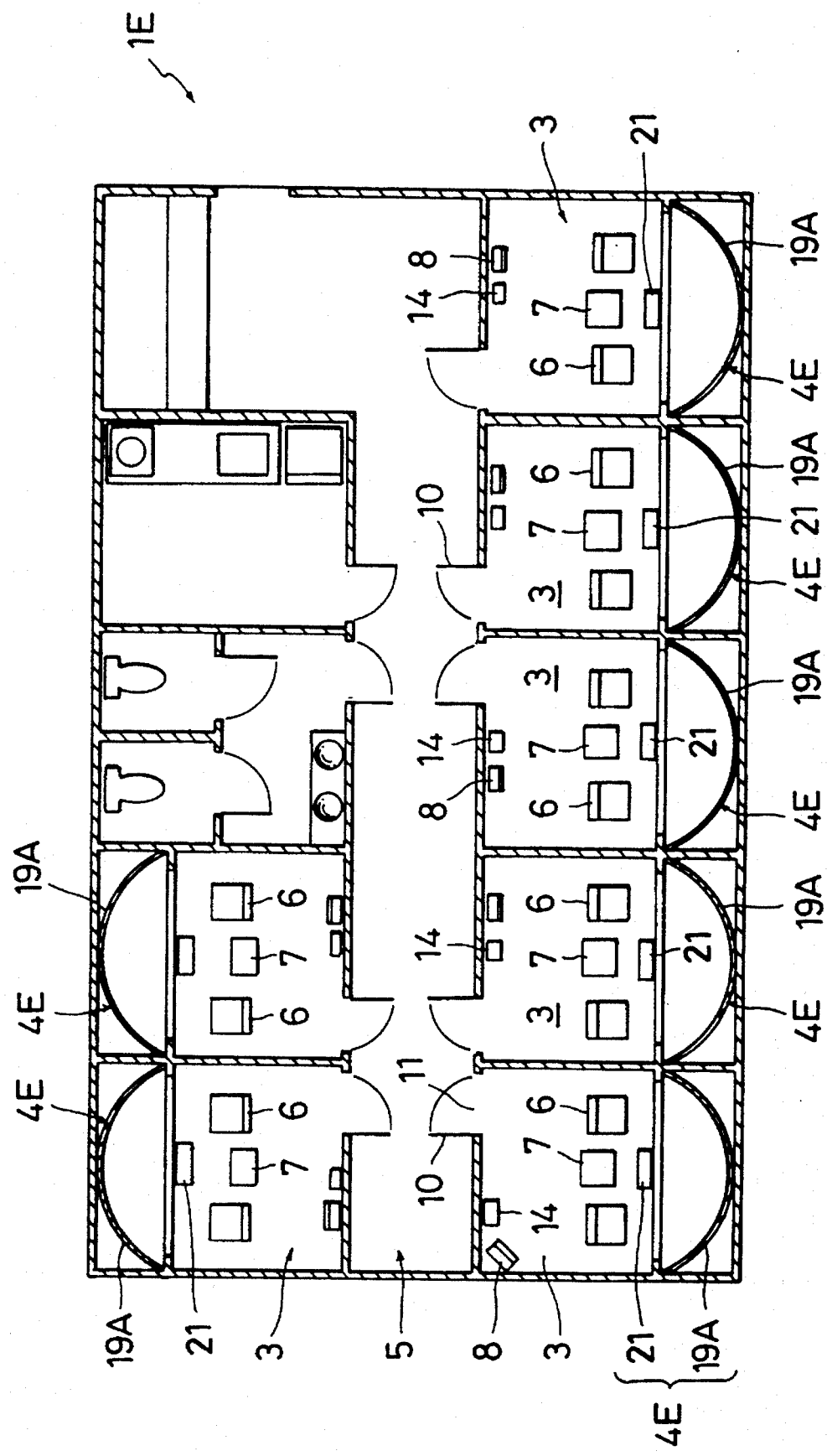
FIGS. 19 to 21 are explanatory views showing a sixth embodiment of the present invention.
Figure 20:
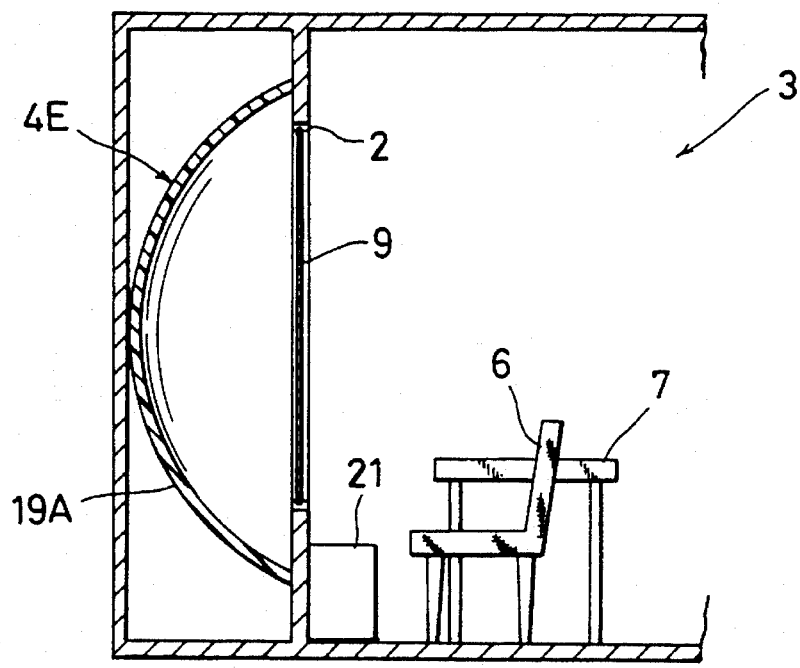
Figure 21:
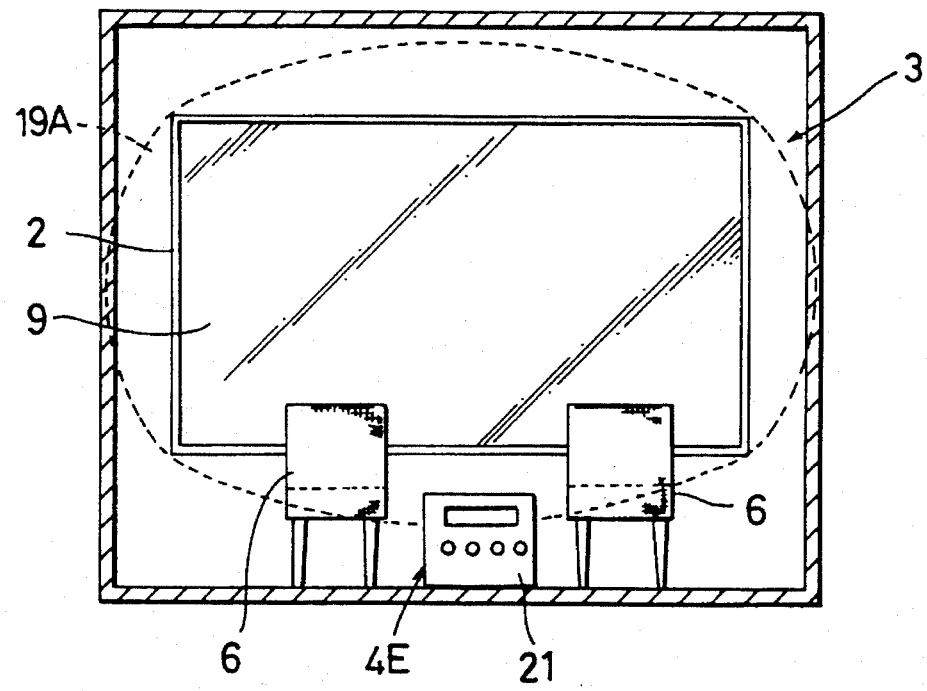

FIGS. 19 to 21 illustrate a sixth embodiment of the present invention which is distinguished from the fourth embodiment by the fact that the domed image producing system 4C is replaced with a further like system 4E which comprises a dome shaped liquid crystal display 19A and a video player 21 for reproducing an image on the liquid crystal display 19A. A dome theater 1E with the liquid crystal displays 19A according to the sixth embodiment will provide the same effects as the fourth embodiment.

Figure 22:
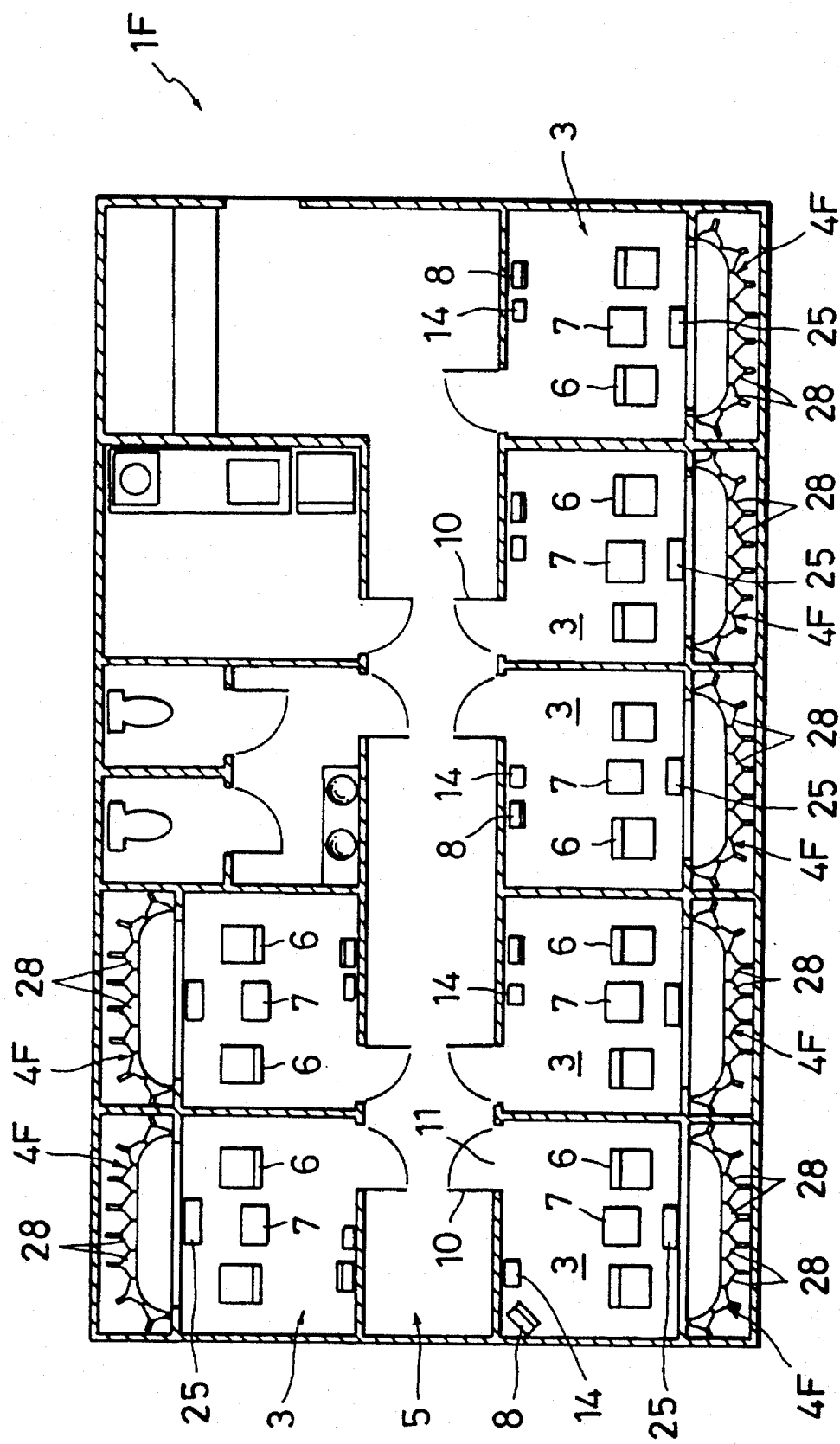
FIGS. 22 to 24 are explanatory views showing a seventh embodiment of the present invention.
Figure 23:
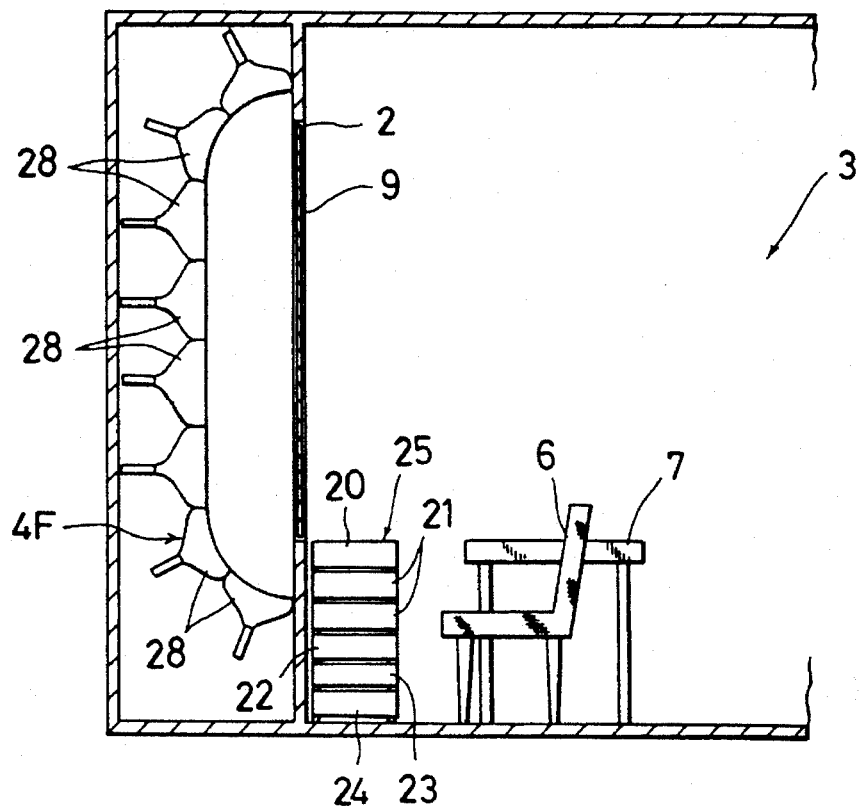
Figure 24:
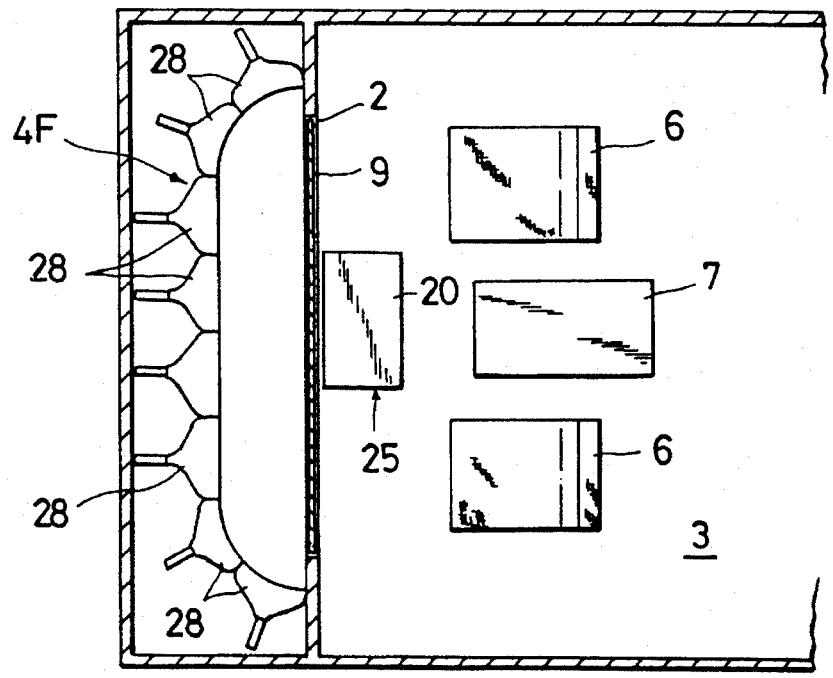

FIGS. 22 to 24 show a seventh embodiment of the present invention which is distinguished from the fourth embodiment by the fact that the domed image producing system 4C is replaced with a further like system 4F. The domed image producing system 4F comprises a multiplicity of monitor television picture tubes 28 arranged in a dome configuration and an AV unit 25 including a double cassette player 20, video players 21, 21, a video selector 22, a mixer 23, and an amplifier 24. A dome theater 1F with the arrayed monitor television picture tubes 28 according to the seventh embodiment will provide the same effects as the fourth embodiment.

Figure 25:
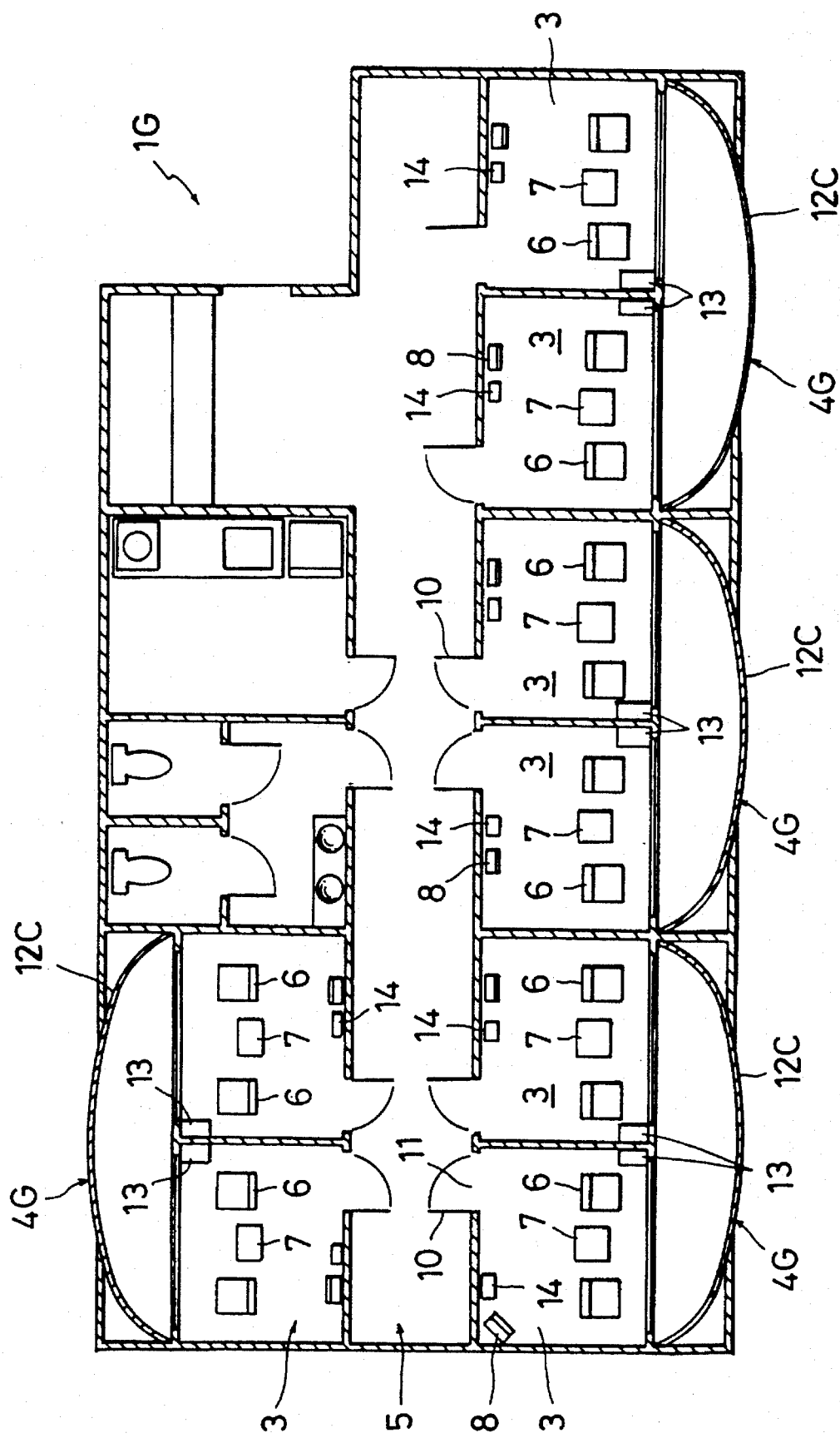
FIGS. 25 to 27 are explanatory views showing an eighth embodiment of the present invention.
Figure 26:
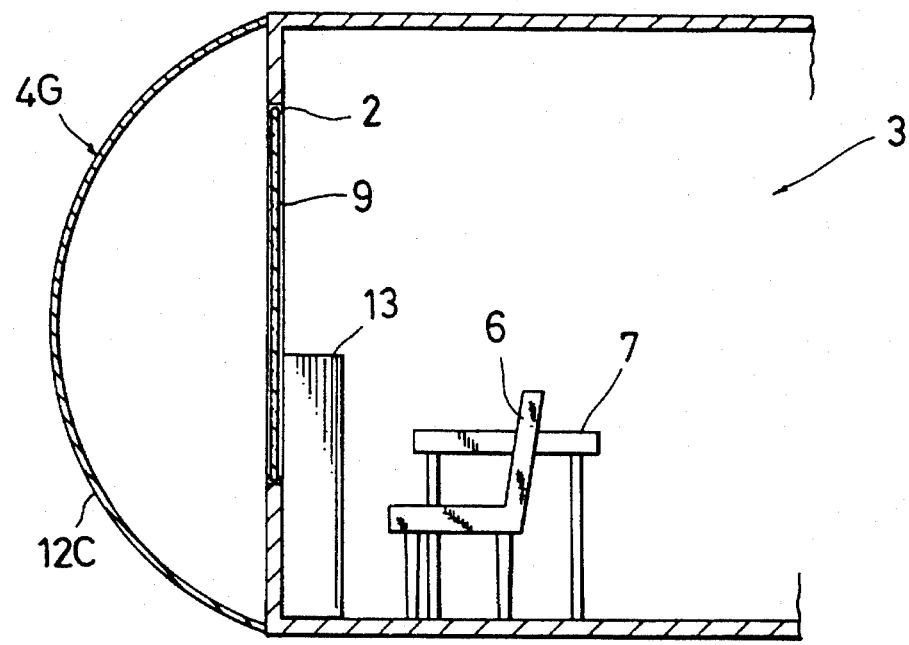
Figure 27:
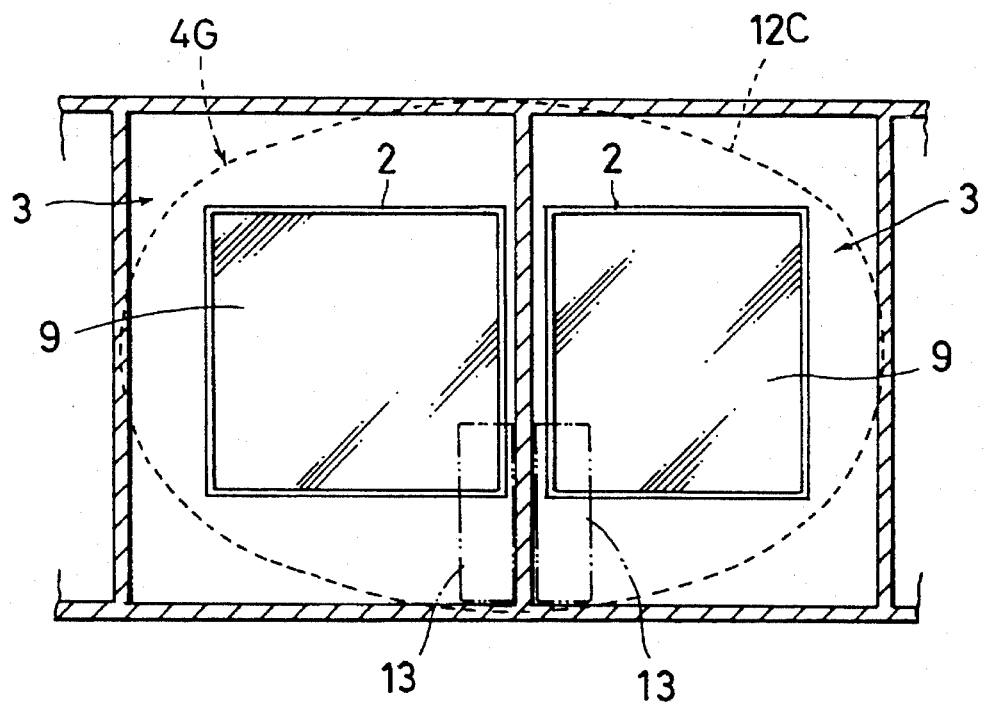

FIGS. 25 to 27 illustrate an eighth embodiment of the present invention which is distinguished from the fourth embodiment by the fact that the domed image producing system 4C is replaced with a further like system 4G which has a larger screen 12G enough to cover the front of more than one, namely two in this embodiment, of the compartments 3. A dome theater 1G with the domed image producing systems 4G according to the eighth embodiment will provide the same effects as the fourth embodiment.

As set forth above, the advantages of the present invention are as follows:

(1) As the domed image producing system is placed in the front of the windows of the compartments which are arranged horizontally and vertically in an array and provided ed at the back with passages for access thereto, spectators can easily watch an image projected on the screen through the windows of their compartments.

The compartments allow the spectators to relax and enjoy the watching as they are isolated from the others. Also, the access to the compartments is eased, reducing disturbance in the audience.

(2) As discussed above, the dome shaped screen is well spaced from the windows of the compartments thus making the image highly realistic and more panoramic.

(3) As discussed above, each compartment is isolated from the other compartments allowing the spectators to drink, eat, or chat without disturbing the other audience and may be utilized as a restaurant, tea, or karaoke room.

(4) As discussed above, the compartments are so allocated as to have substantially equal viewing conditions, thus contributing to the optimum use of the viewing space.

(5) Additionally, the compartments are intended to be more identical in the viewing condition to each other while ensuring the advantages depicted in the paragraphs (1) to (4).

What is claimed is:

1. A dome theater comprising:

compartments arranged horizontally and vertically in an array, each compartment having a front side with a window;

a domed image producing system having a substantially hemispherical display surface;

said substantially hemispherical display surface being disposed in front of the windows of the compartments such that a plane tangent to a center thereof is substantially vertical to allow spectators in the compartments to view an image through the windows; and said compartments having back sides, opposite said windows, with passages therein for access to the compartments.

2. A dome theater according to claim 1, wherein the compartments are disposed with setbacks relative to each other that are dependent upon a radial distance from a center of the array, the setbacks decreasing as said radial distance increases.

3. A dome theater according to claim 1, wherein the domed image producing system comprises said substantially hemispherical display surface being a dome shaped screen and a projector for projecting an image on the dome shaped screen.

4. A dome theater according to claim 1, wherein the domed image producing system comprises said substantially hemispherical display surface being a liquid crystal display of a dome shape and an AV apparatus including videotape players for reproducing an image on the liquid crystal display.

5. A dome theater according to claim 1, wherein the domed image producing system comprises said substantially hemispherical display surface being a multiplicity of monitor television picture tubes arranged together in a dome configuration and an AV apparatus including videotape players for reproducing an image on the dome configuration of the monitor television picture tubes.

6. A dome theater according to claim 1, wherein the passages have floor corridors for easy access to the compartments, stairways leading one floor corridor to another, and elevators for carrying the spectators from one floor to another.

7. A dome theater comprising:

one or more compartments, each having a window arranged in the front thereof; and a domed image producing system having a substantially hemispherical display surface;

said substantially hemispherical display surface being disposed in front of one or more compartments such that a plane tangent to a center thereof is substantially vertical to allow spectators in said one or more compartments to view an image through said windows.

8. A dome theater according to claim 7, wherein the domed image producing system comprises said substantially hemispherical display surface being a dome shaped screen and a projector for projecting an image on the dome shaped screen.

9. A dome theater according to claim 7, wherein the domed image producing system comprises said substantially hemispherical display surface being a liquid crystal display of a dome shape and an AV apparatus including videotape players for reproducing an image on the liquid crystal display.

10. A dome theater according to claim 7, wherein the domed image producing system comprises said substantially hemispherical display surface being a multiplicity of monitor television picture tubes arranged together in a dome configuration and an AV apparatus including videotape players for reproducing an image on the dome configuration of the monitor television picture tubes.

11. A theater comprising:

viewing compartments in a vertical array;

said viewing compartments having viewing apertures disposed in front sides thereof;

access means for accessing said viewing compartments;

a domed image producing system having a semi-spherical display surface, the semi-spherical display surface being less than a hemisphere; and said semi-spherical display surface being bounded along a first edge thereof by a horizontal plane substantially normal to said vertical array of viewing compartments and along a second edge by said vertical array.

* * * * *